United States Patent [19]
Quimpo

[11] 3,878,634
[45] Apr. 22, 1975

[54] FLOATING FISHING DEVICE

[76] Inventor: Jacob R. Quimpo, 3406 Mt. Aachen Ave., San Diego, Calif. 92111

[22] Filed: Mar. 20, 1974

[21] Appl. No.: 452,744

Related U.S. Application Data

[63] Continuation-in-part of Ser. No. 342,793, March 19, 1973, abandoned.

[52] U.S. Cl. .................................................. 43/15
[51] Int. Cl. ........................................... A01k 93/00
[58] Field of Search ............. 43/15, 16, 43.11, 26.1

[56] References Cited
UNITED STATES PATENTS
1,177,885  4/1916  Molhar .................................. 43/16

| | | |
|---|---|---|
| 1,850,296 | 3/1932 | Vermeulen ............................. 43/15 |
| 2,545,385 | 3/1951 | Reppert et al. ........................ 43/15 |
| 2,585,783 | 2/1952 | Johnston ................................. 43/15 |

*Primary Examiner*—Warner H. Camp
*Attorney, Agent, or Firm*—Ralph S. Branscomb

[57] ABSTRACT

The invention comprises a buoyant body provided with two fishing lines with internal spring-loaded reels to take in the lines individually upon the triggering thereof by a fish. Should both lines be hit at once, the fish in effect wear each other out until the lines are reeled in. The fisherman, who may or may not have a line attached to the device, follows the body around the surface of the water in a boat until the fish have been reeled in completely.

7 Claims, 6 Drawing Figures

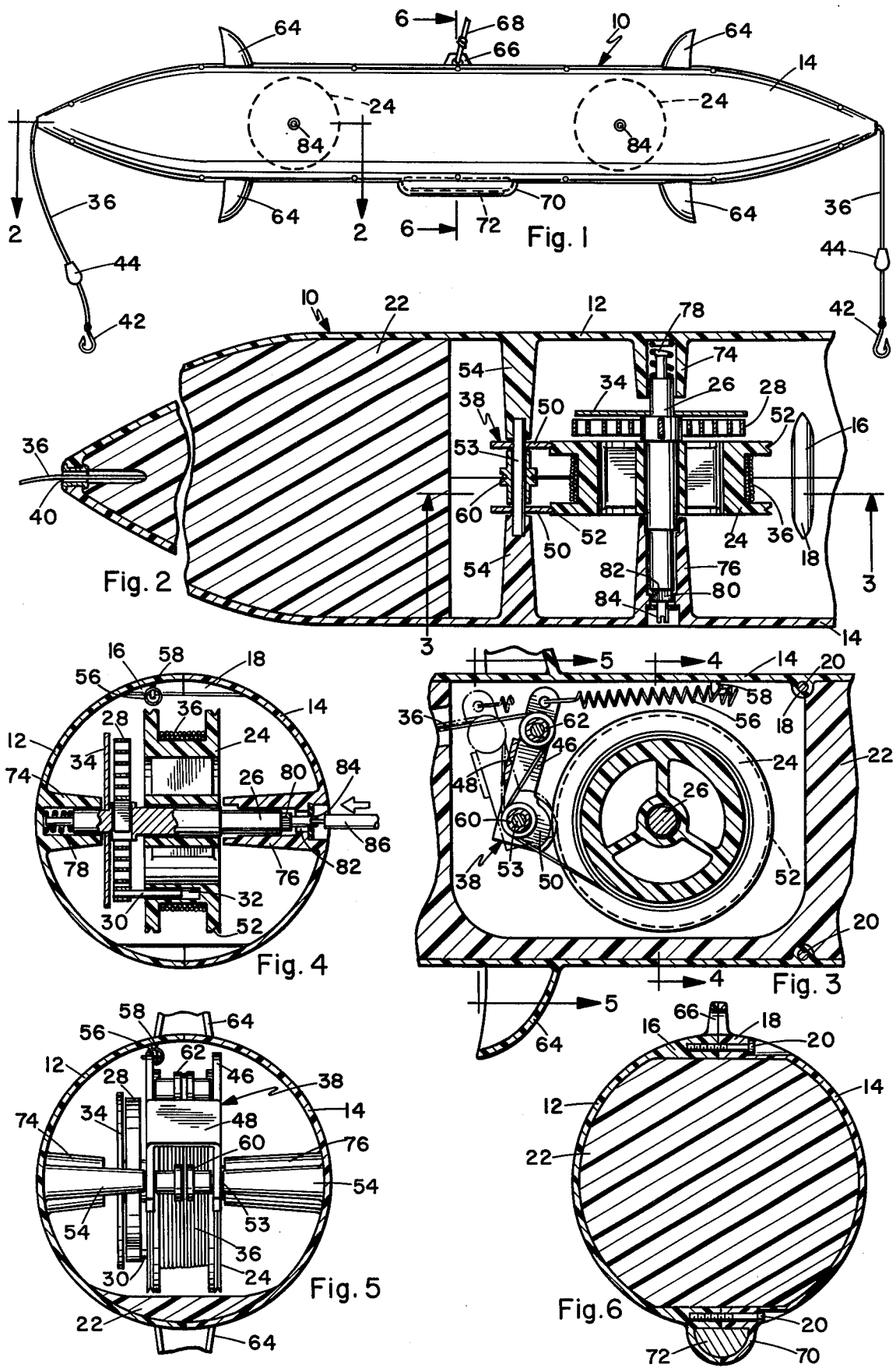

3,878,634

FLOATING FISHING DEVICE

This is a continuation-in-part of Application Ser. No. 342,793 filed Mar. 19, 1973, and now abandoned.

BACKGROUND OF THE INVENTION

The invention is in the field of fishing floats of the type having an attached line with a hook, the line being automatically snapped back or jerked upon the taking the hook and bait by a fish.

There are fishing devices currently in use which in one way or another spring-load the fishing line so that the hook is automatically jerked in response to a nibble on the bait, the error in judgment of the fisherman in his timing thus being eliminated. The devices are restricted to the sole function of securely hooking the fish before the fish becomes suspicious of the bait.

Another related device shown in U.S. Pat. No. 2,734,300 acts as a trolling aid to a shore based fisherman. That unit is launched into the water off-shore and offers resistance to the water which varies with the tension on the line.

There has not heretofore been available, however, a self-contained automatic fishing device capable of hooking, trailing, and reeling in one or more fish completely independently of any effort on the part of the fisherman.

SUMMARY OF THE INVENTION

The invention comprises two molded half-shells fastened together to define a hollow elongated body, flotation being provided by buoyant inserts of plastic foam or the like.

Two reels are mounted in the body and biased for rotation by spiral springs. A fishing line is fastened to each reel and extends externally of the body through apertures in the ends, the distal ends of the lines being provided with conventional hook and sinker arrangement.

Each of the reels is provided with a brake to prevent ultimately winding of the lines. A pulley arrangement on the brakes tracks the respective line and upon tensioning of the line the brake releases the reel to draw in the line. Brake pressure and the tension on the spiral springs are both adjusted by the user to accommodate different fishing conditions, determined principally by the size and strength of the prevailing species of fish.

BRIEF DESCRIPTION OF THE DRAWINGS

FIG. 1 is a side elevation view of the device;

FIG. 2 is an enlarged sectional view taken on line 2—2 of FIG. 1;

FIG. 3 is a sectional view taken on line 3—3 of FIG. 2;

FIG. 4 is a sectional view taken on line 4—4 of FIG. 3, showing the method of winding the reel spring;

FIG. 5 is a sectional view taken on line 5—5 of FIG. 3; and

FIG. 6 is an enlarged sectional view taken on line 6—6 of FIG. 1.

DESCRIPTION OF THE PREFERRED EMBODIMENT

The fishing device comprises an elongated hollow body 10 having tapered ends and constructed as two mating half-shells 12 and 14 which are preferably fabricated of molded plastic and brightly colored for high visibility. The two shells can be fastened together in any fashion, but as explained hereinafter the shells should be separable, and to that end in the illustrated embodiment the half-shell 12 is provided along its edges with spaced reinforced portions 16 which are partially bored to receive screws, and the half-shell 14 is provided with corresponding reinforced portions 18 which have countersunk bores therein to receive the shank and head portions of the joining screws or bolts 20.

Flotation is ensured by the inclusion of buoyant material such as plastic form 22 which is inserted in the ends and central portions of the body and retained in place by friction or glue.

The working mechanism of the device includes a pair of identical oppositely directed spring-loaded reel and fishing line assemblies. It will be subsequently clear that only one assembly could be used, and for simplicity only one of the identical assemblies is illustrated and described, though certain advantages flow from the duplication.

A reel 24 is journalled on a shaft 26, the shaft being non-rotational in ordinary use and mounted transversely in the body. Adjacent the reel is a coiled or spiral leaf spring 28 which is fastened to the shaft at its inner end and engages the reel by its outer end. The engagement means is rather diagrammatically illustrated as a pin 30 fastened to the spring 28 and extending into a socket 32 in the reel. It is important in the preferred embodiment that the spring and reel be axially independent because of the particular manner in which the spring tension is adjusted. A backing plate 34 serves to support the spring on the side remote from the reel. It is contemplated that other alternative arrangements might be used to rotatively bias the reel, and the illustrated coil spring structure is intended to be exemplary rather than confining.

Attached to the reel is a length of fishing line 36 which is almost completely wound on the reel when it is free to rotate under the action of the spring. The line passes from the reel through a brake mechanism 38 and is threaded through a passage in the buoyant material 22 and exits the body through an aperture 40, the end of the line being provided with a conventional hook 42 and sinker 44.

The brake mechanism 38 is preferably of stainless steel construction and comprises a pair of parallel lever arms 46 joined together and spaced apart a distance approximately equal to the side walls of the reel 24 by a plate 48. The lower portions of the lever arms are cam-shaped as at 50 and have wedge shaped edges to securely engage in the annular grooves 52 in the side walls of the reel. The brake is journalled on a shaft 53 which is captured between opposed body protrusions 54. The pivotal axis of the brake is parallel to the reel axis and is disposed in relation to the reel such that in the normal braking position, shown in solid lines in FIG. 3, the cams engage the reel and arrest its motion.

A spring 56 is attached to one of the lever arms and is retained by a hook 58. The spring tension is adjustable by simply engaging a different coil of the spring on the hook. This particular arrangement requires that the two half-shells be separable to effect this adjustment, as mentioned above. Other, externally operable, spring adjustment structures are conceivable to obviate the need to open the body, although internal access is desirable for the further purposes of repair and unfouling tangled line.

Journalled on the shaft 53 is a pulley 60, and a similar pulley 62 is rotatably mounted between the lever arms above the lower pulley, and the fishing line is threaded around the pulleys as shown. It is clear at this point that a tug on the line outside the body will result in the pivoting of the brake mechanism from its operative position into the position shown in phantom in FIG. 3, thereby releasing the reel and permitting it to draw in the line.

A fish nibbling on the bait immediately experiences a tug on the line which securely fixes the hook in the mouth of the fish, and thereafter the reel will slowly take in the line so long as the tension remains. The device is towed by the fish around on the surface, or may even be dragged under, until, as the fish becomes increasingly tired, the line is completely reeled in.

To provide more water resistance and thus tire the fish more quickly, the body is equipped with two pairs of cup or ear-shaped protrusions 64 mounted near each end of the body on opposite sides thereof to ensure that two of the protrusions are submerged at any time.

There is an eyelet 66 in the top of the body for the attachement of the fisherman's line or tether 68, and to maintain the body in upright condition to minimize the chances of the tether becoming fouled with the fishing lines, an elongated compartment 70 is molded into the bottom of the body and is filled with lead or other heavy material 72 to ballast the structure.

In order to use a longer fishing line, or to increase the reel force when larger fish are available, the following structure is provided to permit easy adjustment of the tension on the reel spring 28. As is best illustrated in FIG. 4, the reel shaft 26 is journalled in two tubular projections 74 and 76 of the half-shells. A coil spring 78 axially biases the shaft toward the half shell 14. The end of the shaft remote from the spring has a radially reduced collar 80 which is non-circular, preferably square, in cross-section and seats snugly in a similarly shaped receptacle 82 when the angular orientation of the shaft is proper. In this position the shaft is prevented from rotating.

A further radially reduced extension 84 of the shaft projects externally of the shell 14 and is provided with a screwdriver slot or other means of permitting engagement of the shaft for rotation from outside the body. Upon displacing the shaft against the spring 78 and thereby freeing the collar 80 from the receptacle 82 as by pressure exerted by the screwdriver 86, the shaft is free to rotate and thus the tension on the spring 28 can be adjusted. It should be recalled that the spring is fixed to the shaft whereas the reel, which is gripped by the brake 38, remains stationary when the shaft is removed.

The pleasure provided by the device is increased by the duplication of the line and reel mechanism since by allowing two fish to be caught simultaneously on separate lines, they work against each other. This occurs because of the proclivity of a hooked fish to swim against the restraining force of the line rather than to allow the line to slacken, so that the two fish would normally swim in opposite directions after hooking. For this reason, although only one reel assembly could clearly be used, the duplication in one single unit has a function above that of two separate, single-line floats.

I claim:

1. A floating fishing device comprising:
   a. a buoyant body;
   b. a reel rotatably mounted within the body;
   c. a fishing line secured to said reel and extending externally of the body;
   d. means to bias said reel for rotation in one direction to wind up said line;
   e. releasable friction brake means engaging said reel for preventing the rotation of the reel in operative position and including means engaging and operable by said line when under a predetermined tension to release the reel for rotation, and means for biasing said brake means into reel engaging position such that same is operative to brake said reel upon said line being slack.

2. Structure according to claim 1 wherein said body is elongated and has an aperture in each end and said reel, bias means, and brake means are duplicated, each reel having attached thereto a fishing line individually threaded through one of said apertures, whereby two simultaneously hooked fish tend to draw the body in opposite directions resulting in the tiring of both of such fish.

3. Structure according to claim 2 wherein said elongated body has tapered ends and including two pairs of cupped protrusions, each pair being mounted on said body adjacent to and directed toward one of said ends to increase the water resistance of the device in use.

4. Structure according to claim 1 and including a shaft mounted in said body, said reel being journaled on said shaft, said bias means comprises a spiral spring coiled around said shaft and fixed thereto at its inner end and engaging said reel at its outer end, said shaft being rotatable in the body to tension said spiral spring, and including detent means to releasably lock said shaft against rotation subsequent to winding the spring.

5. Structure according to claim 4 wherein said shaft is axially displaceable in the body, and has a non-circular collar near one end thereof and means to bias the shaft toward said one end, said detent means comprising a non-circular receptacle integral with said body for engaging said collar when same is seated therein, said shaft being accessible externally of the body to allow displacement of same away from the receptacle, and means to rotate said shaft when so displaced.

6. Structure according to claim 1 wherein said means operable by said line comprises a lever arm pivotably mounted in said body and having a cam thereon, said arm having a first position in which said cam bears on said reel and a second position in which the cam is free of the reel, and including said means to bias said arm into said first position;

said lever arm having a means for tracking the fishing line extending from said reel such that a predetermined tension on the line pivots said lever arm into the second position.

7. Structure according to claim 6 wherein the means to bias said arm is an adjustably tensioned spring.

* * * * *